(No Model.)
E. EMMERT.
ROAD CART.
No. 313,485. Patented Mar. 10, 1885.
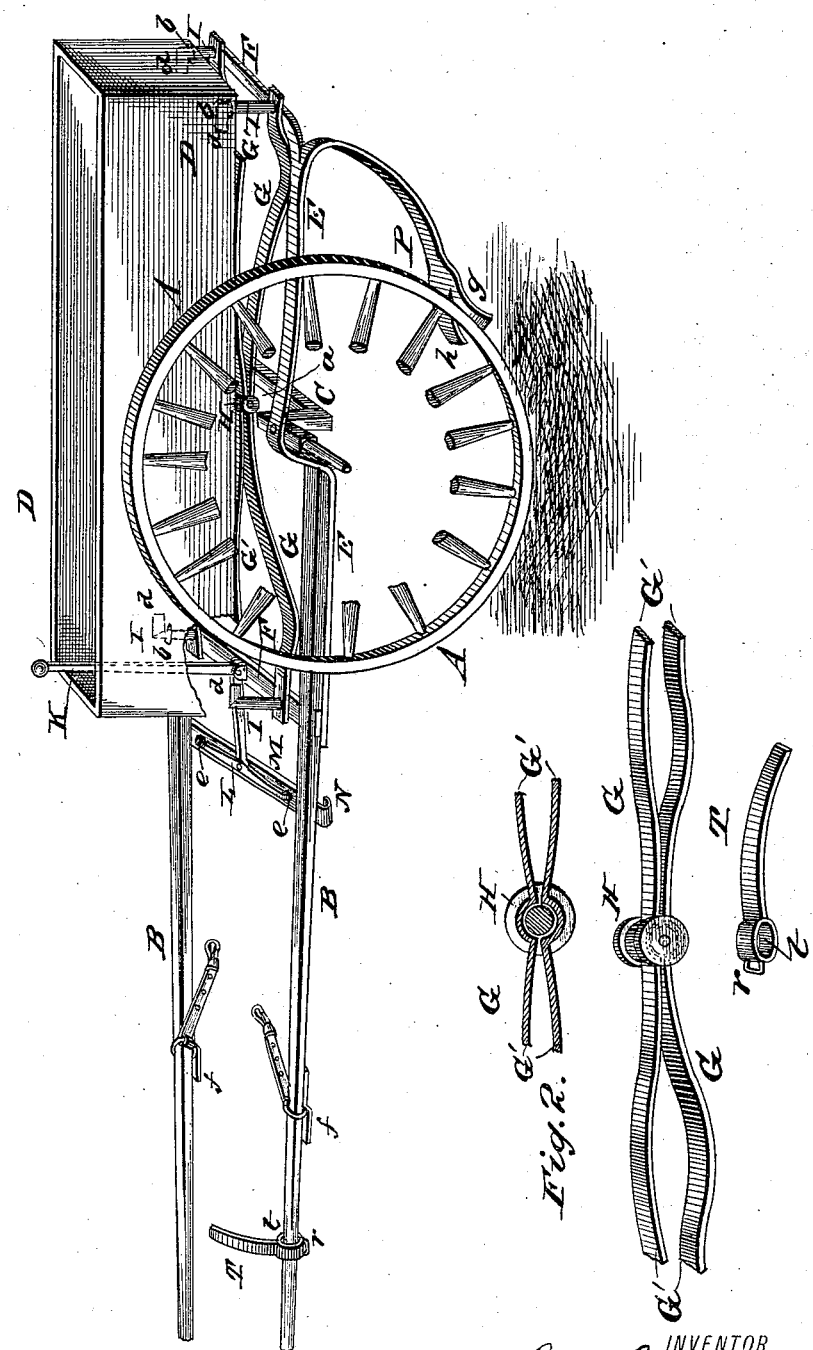
WITNESSES
Phil C. Dieterich.
W. Heyworth,
INVENTOR
Ezra Emmert
by
Manahan & Ward ATTORNEYS.

UNITED STATES PATENT OFFICE.

EZRA EMMERT, OF DIXON, ILLINOIS.

ROAD-CART.

SPECIFICATION forming part of Letters Patent No. 313,485, dated March 10, 1885.

Application filed June 19, 1884. (No model.)

*To all whom it may concern:*

Be it known that I, EZRA EMMERT, a citizen of the United States, residing at Dixon, in the county of Lee and State of Illinois, have invented certain new and useful Improvements in Road-Carts; and I do hereby declare the following to be a full, clear, and exact description of the invention, such as will enable others skilled in the art to which it appertains to make and use the same, reference being had to the accompanying drawings, and to letters or figures of reference marked thereon, which form a part of this specification.

My invention pertains to road-carts; and it consists more especially, first, in certain novel improvements to avoid what is termed the "horse motion" in such vehicles; and, second, in a new and useful provision for preventing the mud raised by the carrying-wheels from being cast into the vehicle.

Road-carts, from their cheapness and ease of management, have become of late years quite popular. Their use would be much more general were it not for what is called the "horse motion," which has heretofore seemed to be inseparable in some degree from that style of carriage. This motion is caused by the constant raising and lowering alternately of the horse's body in the exercise of trotting. It is well known to every person who has ever ridden a horse on the trot that the back of the animal moves up and down with each step which he takes, the degree of change in altitude varying with different horses. When the horse is placed between the thills of a vehicle, and such thills are supported at each side by a strap passed over the animal's back, this motion is of course communicated to such thills. In four-wheeled vehicles the thills have a pivoted connection at their rear ends to the front axle of the carriage, which permits the vertical oscillation of the thills without imparting any of such motion to such axle; but in a two-wheeled vehicle the thills or shafts are either directly or indirectly rigidly attached to the one axle of the cart, because it is by means of the thills that the cart is held in an upright position, and were the connection of the thills to the cart of the pivotal character in use on four-wheeled vehicles the cart would tilt backward or forward, and would be useless. From this necessary rigid connection of the thills to the axle in carts it results that the vertical oscillation of the thills imparts to such axle a partially-rotary movement, which, unless some preventive provision be adopted, is communicated in a magnified degree to the body of the vehicle; and if the body be rigidly placed upon such axle the former will describe the same partial circles as does the periphery of the axle, but in longer arcs.

Heretofore it has been sought to avoid this unpleasant oscillation of the body of the cart by making a very loose spring-connection between the body and axle of the cart, but inasmuch as in such constructions there was some connection of the body to the axle the difficulty, though in some instances largely modified, in some measure remained.

In my invention the controlling idea is to give the body of the vehicle a pivotal connection to the axle on a line with the center of motion of the latter. It is obvious that the thill oscillation hereinbefore referred to has its minimum at the axle; therefore, if the junction of the body with the axle is made at this point, and is made pivotally, so that no oscillation of the axle is transmitted to the body, the latter will be carried free of such oscillating motion.

In the drawings, Figure 1 is a partially oblique side elevation of a vehicle embodying my invention, the wheel being partially removed to permit a better view. Fig. 2 is a detail view of the springs G and thill-brace T.

A A are the carrying-wheels. B B are the thills, attached rigidly in any suitable way to the axle C a short distance from the inner face of the wheels A. The axle C, from inside the point of junction of the thills B, and outside the outer line of the body D, is bent downward a sufficient depth to permit the attachment, hereinafter named, which supports the body D, to be lowered into the recess $a$ thus formed in the upper surface of such axle.

Bars E E (which may or may not be the extension of the thills B) extend to the rear of the axle C in about the line of prolongation of the thills B.

F F are transverse bars, suitably attached, respectively, to the under side of the thills B B, in front of the axle C, and to the rear ends of the bars E behind such axle.

G G are springs placed longitudinally slightly inside of the outer line of the body D, and supported at their respective ends by the transverse bars F F. The springs G have their central portion bent upward, and upon the central part of such bend are suitably seated the rollers H H, having their axes in the line of the axle C.

Care must be taken in placing the springs G to get the rollers H as near as practicable in a line with the center of the axle C. This can be accomplished by making the recess $a$ in such axle of sufficient depth and attaching the ends of the springs G low, bending downward that portion of the lower half of such springs intermediate the rollers H and the end attachment, and placing the ends of such spring some distance below the bars F by means of a pendant, if necessary.

As I claim the pivotal seating of the body D at or near the axle C, I do not mean to limit myself to the use of the rollers H. A ball-and-socket joint, a hinge, or other pivotal or jointed bearing would subserve the purpose in view, and such joint may be placed under the spring or on the axle.

The springs G are shown but on one side, and are each composed of two distinct leaves, G', the upper one of each pair having its ends bearing against the bottom of the body D.

The roller H is shaped somewhat like an ordinary spool, having its ends of greater diameter than its central portion. Each leaf G', near its center, has a nearly semi-annular recess, which partially encircles the smaller portion of the roller H from opposite sides thereof, care being taken that the adjacent faces of the leaves G' in each spring G do not abut against each other. In this way each leaf G' acts independently of its opposing leaf, and the oscillating motion of the lower leaf is not transmitted to the upper one. In addition, the leaves G' form a pivotal seat for the roller H.

I I I I are short posts seated on the bars F at the four corners of the body D, and projecting through the bottom of such body in slots $b$ therein, and furnished at their upper ends with lugs $d$, to prevent the body from being thrown off.

In the oscillation termed "horse motion" the pivoted connection aforesaid of the body D to the axle C permits such axle C to rock without communicating such oscillation to the body D, as such motion is allowed to exhaust itself partly in the rotation of the rollers H on their own axles and partly in the movement of the periphery of such rollers along the bottom of such body. The vertical oscillation of the ends of the springs G is permitted to exist without affecting the body by the reciprocating movement of the posts I in the slots $b$.

P are combined scrapers and fenders having their shank suitably attached to the bars E in rear of the axle C, and their free ends formed into the scraper $g$ and fender $h$, and placed adjacent to the periphery of the wheels A, at the rear of the latter, and slightly below the line of the lower part of the axle C. It has been customary to place the fenders over the upper portion of the wheel and extending to the front of the same. This construction, while inconvenient and unsightly, also was open to the objection of being at a point where the wheel had the greatest velocity, and permitted the rear part of the wheel to throw the mud into or against the body of the vehicle. In my construction, by having the scraper-face $g$ scrape the rising mud back, and the fender-face placed beside the inside of the felly of the wheel A, and this soon after that portion of the wheel leaves the earth, I prevent the mud rising or attaining any velocity.

In addition to the horse motion or oscillation in a vertical plane before referred to, carts are liable to an oscillation in a horizontal plane from one wheel striking an obstruction or dropping into a depression. In four-wheeled vehicles this is of no account, as the body is pivotally seated on the front axle, so that the latter may oscillate in a horizontal plane without affecting such body; but in carts any twist of the axle in a horizontal plane is communicated to the body, for the reason that the latter has more than one bearing on the axle or on the parts united to such axle. To avoid this lateral twist of the cart, I provide stiff braces T, preferably of metal, having in their respective lower ends holes $t$, to receive the thills B, and suitably attached by their upper portions or shanks to the back-band of the harness, and having loops $r$ below the thills B, to permit such braces to be connected under the horse by a belly-band. It is obvious there can be no lateral twist of the axle C unless the thills B share therein and in a magnified degree. Therefore, as the braces T hold the thills from lateral swinging, there can be no lateral oscillation of the axle; and even a slight lateral swing near the front ends of the thills B would not be perceptible at the axle C, because the latter is the pivotal point, while the thills are the levers. The difficulty with the present mode of carrying the thills is that, being of leather, it is too flexible and permits a lateral oscillation of the thills and thereby of the cart.

What I claim as my invention, and desire to secure by Letters Patent of the United States, is—

1. The combination of the axle C, provided with the recess $a$, the springs G, rollers H, seated therein, the body D, provided with the slots $d$, and the posts I, whereby the body D is connected to the running-gears of the vehicle solely at the rollers H, and the vertical oscillation of such running-gears is not communicated to such body at either end of the latter, substantially as shown, and for the purpose described.

2. In a sulky or road-cart, the posts I, seated on the running-gears of the vehicle, and inserted loosely in slots $b$ in the body of the vehicle, whereby such posts may have a vertical movement without communicating the same to such body, substantially as shown, and for the purpose named.

3. The combination of the running-gears of the vehicle provided with the posts I, and the body D, provided with slots $b$, such body being pivotally seated at or near its center upon such running-gears, for the purpose named.

4. The combination of the bars F F, suitably supported from the axle C, the springs G, posts I, rollers H, body D, and axle C, substantially as shown, and for the purpose specified.

5. The combination of the scraper P, suitably attached to the frame of the vehicle, and provided with scraper-edge $g$ and fender $h$, and the wheel A, substantially as shown, and for the purpose described.

In testimony whereof I affix my signature in presence of two witnesses.

EZRA EMMERT.

Witnesses:
 WALTER N. HASKELL,
 V. S. FERGUSON.